United States Patent
Henry et al.

(10) Patent No.: US 11,741,573 B2
(45) Date of Patent: Aug. 29, 2023

(54) SYSTEM AND METHOD FOR RECREATING IMAGE WITH REPEATING PATTERNS OF GRAPHICAL IMAGE FILE TO REDUCE STORAGE SPACE

(71) Applicant: Rockwell Collins, Inc., Cedar Rapids, IA (US)

(72) Inventors: Jeff M. Henry, Cedar Rapids, IA (US); Kyle R. Peters, Ely, IA (US); Reed A. Kovach, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/525,572

(22) Filed: Nov. 12, 2021

(65) Prior Publication Data

US 2023/0153947 A1 May 18, 2023

Related U.S. Application Data

(60) Provisional application No. 63/278,576, filed on Nov. 12, 2021.

(51) Int. Cl.
  *G06T 3/60* (2006.01)
  *G06T 3/40* (2006.01)
  (Continued)

(52) U.S. Cl.
  CPC ............. *G06T 3/60* (2013.01); *B64D 43/00* (2013.01); *G06T 3/40* (2013.01); *G06T 7/60* (2013.01); *G06T 2207/30242* (2013.01)

(58) Field of Classification Search
  CPC ... G06T 2207/30242; G06T 3/60; G06T 3/40; G06T 7/60; B64D 43/00
  See application file for complete search history.

(56) References Cited

U.S. PATENT DOCUMENTS

| 3,522,586 A | 8/1970 | Kiji et al. |
| 3,656,178 A | 4/1972 | Maine et al. |
| (Continued) | | |

FOREIGN PATENT DOCUMENTS

| CA | 3095088 C | 2/2021 |
| CN | 1045835 C | 10/1999 |
| (Continued) | | |

OTHER PUBLICATIONS

ArcGIS, "Introduction to export a map or layout", retrieved from the Internet Nov. 11, 2021.
(Continued)

*Primary Examiner* — Phi Hoang
(74) *Attorney, Agent, or Firm* — Suiter Swantz pc llo

(57) ABSTRACT

A system may include a computer readable medium and a processor communicatively coupled to the computer readable medium. The processor may be configured to: obtain a graphical image file, the graphical image file including an image, wherein the image includes at least one sequence of repeating pattern elements, each of the at least one sequence including the repeating pattern elements that are repeated along a linear direction; and convert the graphical image file to at least one file including hardware directives that when executed cause a recreation of the image of the graphical image file to be drawn, wherein a file size of the at least one file is smaller than the graphical image file.

20 Claims, 7 Drawing Sheets

(51) Int. Cl.
*B64D 43/00* (2006.01)
*G06T 7/60* (2017.01)

(56) References Cited

U.S. PATENT DOCUMENTS

| | | | |
|---|---|---|---|
| 4,096,527 A | 6/1978 | Furuta | |
| 4,792,981 A | 12/1988 | Cahill, III et al. | |
| 4,876,651 A | 10/1989 | Dawson et al. | |
| 5,050,230 A | 9/1991 | Jones et al. | |
| 5,428,692 A | 6/1995 | Kuehl | |
| 5,454,076 A | 9/1995 | Cain et al. | |
| 5,499,382 A | 3/1996 | Nusinov et al. | |
| 5,537,669 A | 7/1996 | Evans et al. | |
| 5,559,707 A | 9/1996 | DeLorme et al. | |
| 5,577,170 A | 11/1996 | Karow | |
| 5,936,637 A | 8/1999 | Seto | |
| 5,978,715 A | 11/1999 | Briffe et al. | |
| 6,014,133 A | 1/2000 | Yamakado et al. | |
| 6,275,610 B1* | 8/2001 | Hall, Jr. | G06V 30/262 |
| | | | 382/176 |
| 6,320,984 B1 | 11/2001 | Shigeta | |
| 6,448,922 B1 | 9/2002 | Kelly | |
| 6,501,441 B1 | 12/2002 | Ludtke et al. | |
| 6,839,714 B2 | 1/2005 | Wheeler et al. | |
| 7,039,505 B1 | 5/2006 | Southard et al. | |
| 7,096,211 B2 | 8/2006 | Fujihara | |
| 7,173,738 B2 | 2/2007 | Kohn | |
| 7,552,010 B2 | 6/2009 | Saito | |
| 7,552,011 B2 | 6/2009 | Ishii et al. | |
| 7,562,289 B2 | 7/2009 | Bufkin et al. | |
| 7,581,036 B2 | 8/2009 | Powell et al. | |
| 7,609,263 B2 | 10/2009 | Nagasaki et al. | |
| 7,739,622 B2 | 6/2010 | DeLine et al. | |
| 7,777,749 B2 | 8/2010 | Chung et al. | |
| 7,948,502 B2 | 5/2011 | Stanton | |
| 7,966,609 B2 | 6/2011 | Serebryany | |
| 8,035,642 B2 | 10/2011 | Suzuki | |
| 8,165,732 B2 | 4/2012 | Corbefin et al. | |
| 8,169,505 B2 | 5/2012 | Hoshi | |
| 8,306,745 B1 | 11/2012 | Clark et al. | |
| 8,339,417 B2 | 12/2012 | Stroila et al. | |
| 8,374,390 B2 | 2/2013 | Stroila et al. | |
| 8,379,065 B2 | 2/2013 | Nam et al. | |
| 8,515,658 B1 | 8/2013 | Foster et al. | |
| 8,583,368 B1 | 11/2013 | Sindlinger et al. | |
| 8,704,732 B2 | 4/2014 | Pourbigharaz et al. | |
| 8,937,737 B2 | 1/2015 | Tsutsumi et al. | |
| 9,035,969 B2 | 5/2015 | Ivashin et al. | |
| 9,195,637 B2 | 11/2015 | Peraza et al. | |
| 9,430,195 B1* | 8/2016 | Pecoraro | G06F 40/143 |
| 9,443,433 B1 | 9/2016 | Conway et al. | |
| 9,465,513 B2 | 10/2016 | Sims | |
| 9,489,121 B2 | 11/2016 | Davis et al. | |
| 9,547,727 B2 | 1/2017 | Passani et al. | |
| 9,639,309 B1 | 5/2017 | Pugh | |
| 9,671,935 B2 | 6/2017 | Miichi et al. | |
| 9,703,455 B2 | 7/2017 | Cocco et al. | |
| 9,781,294 B1* | 10/2017 | Chapman | H04N 1/3232 |
| 9,818,051 B2 | 11/2017 | Panek et al. | |
| 9,891,875 B2 | 2/2018 | Kim et al. | |
| 9,921,721 B2 | 3/2018 | Beavers et al. | |
| 9,939,271 B1 | 4/2018 | Foster et al. | |
| 10,001,376 B1 | 6/2018 | Tiana et al. | |
| 10,061,480 B1 | 8/2018 | McCusker et al. | |
| 10,170,010 B1 | 1/2019 | McCusker et al. | |
| 10,372,292 B2 | 8/2019 | Vogel et al. | |
| 10,674,075 B2 | 6/2020 | Kimura | |
| 10,684,769 B2 | 6/2020 | Yamat et al. | |
| 10,872,274 B2 | 12/2020 | Mao et al. | |
| 10,880,522 B2 | 12/2020 | McCutchen et al. | |
| 10,984,501 B2 | 4/2021 | Milan et al. | |
| 11,030,477 B2 | 6/2021 | Becker et al. | |
| 11,061,563 B1 | 7/2021 | Nielsen et al. | |
| 11,106,329 B2 | 8/2021 | He et al. | |
| 2004/0071351 A1 | 4/2004 | Rade | |
| 2005/0030321 A1 | 2/2005 | Anwar | |
| 2005/0091340 A1 | 4/2005 | Facemire et al. | |
| 2006/0031006 A1 | 2/2006 | Stenbock et al. | |
| 2006/0215915 A1 | 9/2006 | Kim | |
| 2007/0067095 A1 | 3/2007 | King | |
| 2007/0094591 A1 | 4/2007 | Etgen et al. | |
| 2007/0112517 A1 | 5/2007 | Goldstein | |
| 2007/0185651 A1 | 8/2007 | Motoyama et al. | |
| 2008/0046254 A1* | 2/2008 | Nuno | G06F 40/151 |
| | | | 705/305 |
| 2008/0103641 A1 | 5/2008 | Ratcliffe | |
| 2008/0240152 A1 | 10/2008 | Quinn et al. | |
| 2009/0080801 A1 | 3/2009 | Hatfield et al. | |
| 2009/0123070 A1 | 5/2009 | Xiaoying | |
| 2009/0125837 A1 | 5/2009 | Hatem et al. | |
| 2010/0128020 A1 | 5/2010 | Oh et al. | |
| 2010/0218089 A1* | 8/2010 | Chao | G09G 5/14 |
| | | | 715/246 |
| 2010/0262318 A1 | 10/2010 | Ariens | |
| 2011/0191014 A1 | 8/2011 | Feng et al. | |
| 2012/0242687 A1 | 9/2012 | Choi | |
| 2012/0287151 A1 | 11/2012 | James et al. | |
| 2014/0168277 A1 | 6/2014 | Ashley et al. | |
| 2014/0225928 A1* | 8/2014 | Konnola | G06F 16/957 |
| | | | 345/636 |
| 2014/0282038 A1 | 9/2014 | Royster et al. | |
| 2015/0070373 A1 | 3/2015 | Clinton | |
| 2015/0239574 A1 | 8/2015 | Ball et al. | |
| 2015/0278626 A1 | 10/2015 | Nakamura | |
| 2015/0324088 A1 | 11/2015 | Pasetto et al. | |
| 2016/0092557 A1 | 3/2016 | Stojanovic et al. | |
| 2018/0181646 A1 | 6/2018 | Balasa et al. | |
| 2018/0253889 A1 | 9/2018 | Nagasaka | |
| 2019/0057671 A1 | 2/2019 | Baer et al. | |
| 2019/0220234 A1 | 7/2019 | Lewis et al. | |
| 2019/0299701 A1* | 10/2019 | Bartels | B42D 25/435 |
| 2020/0089694 A1 | 3/2020 | Cabra et al. | |
| 2020/0195924 A1 | 6/2020 | Hsiang | |
| 2020/0251029 A1 | 8/2020 | Tseng | |
| 2020/0255350 A1 | 8/2020 | Baek | |
| 2020/0320142 A1 | 10/2020 | Malak et al. | |
| 2020/0386567 A1 | 12/2020 | Igarashi | |
| 2021/0004930 A1* | 1/2021 | Kamath | G06T 11/40 |
| 2021/0035453 A1 | 2/2021 | Khan et al. | |
| 2021/0056300 A1 | 2/2021 | Chitta et al. | |
| 2021/0192202 A1 | 6/2021 | Tripuraneni et al. | |
| 2021/0225181 A1 | 7/2021 | Feyereisen et al. | |
| 2021/0349615 A1* | 11/2021 | Ruby | G06F 3/04845 |

FOREIGN PATENT DOCUMENTS

| | | |
|---|---|---|
| CN | 100440222 C | 12/2008 |
| CN | 101751449 A | 6/2010 |
| CN | 101676988 B | 12/2011 |
| CN | 102714759 B | 10/2016 |
| CN | 107026958 A | 8/2017 |
| CN | 107402734 A | 11/2017 |
| CN | 109325083 A | 2/2019 |
| CN | 110727747 A | 1/2020 |
| CN | 110906938 A | 3/2020 |
| EP | 0341645 A2 | 11/1989 |
| EP | 0380294 A1 | 8/1990 |
| EP | 0748562 A1 | 10/1998 |
| EP | 1352315 A2 | 10/2003 |
| EP | 1366462 A2 | 12/2003 |
| EP | 1454213 A1 | 9/2004 |
| EP | 1272977 B1 | 12/2004 |
| EP | 1687777 A2 | 8/2006 |
| EP | 2224359 A2 | 9/2010 |
| EP | 2792998 A2 | 10/2014 |
| EP | 2879061 A2 | 6/2015 |
| EP | 1736894 A4 | 7/2016 |
| EP | 3201879 A1 | 8/2017 |
| EP | 3538978 A4 | 8/2020 |
| EP | 3845862 A1 | 7/2021 |
| GB | 2504085 A | 1/2014 |
| JP | S622721 A | 1/1987 |
| JP | S62196772 A | 8/1987 |
| JP | S6393273 A | 4/1988 |

(56) References Cited

FOREIGN PATENT DOCUMENTS

| JP | H05205069 | A  | 8/1993  |
|----|-----------|----|---------|
| JP | 3871040   | B2 | 1/2007  |
| JP | 2007133231| A  | 5/2007  |
| JP | 2008022215| A  | 1/2008  |
| JP | 2009282855| A  | 12/2009 |
| JP | 4728744   | B2 | 7/2011  |
| WO | 1998043208| A3 | 1/1999  |
| WO | 2011036499| A1 | 3/2011  |
| WO | 2014146561| A1 | 9/2014  |
| WO | 2021035223| A1 | 2/2021  |
| WO | 2021035954| A1 | 3/2021  |

OTHER PUBLICATIONS

Bongwon Suh, Haibin Ling, Benjamin B. Bederson, and David W. Jacobs. 2003. Automatic thumbnail cropping and its effectiveness. In Proceedings of the 16th annual ACM symposium on User interface software and technology (UIST 03). Association for Computing Machinery, New York, NY, USA, 95-104.
Houston, Ben & Nielsen, Michael & Bally, Christopher & Nilsson, Ola & Museth, Ken. (2006). Hierarchical RLE Level Set: A compact and versatile deformable surface representation. ACM Trans. Graph.. 25. 151-175.
Jeppesen, "JeppView for Windows, User Guide", (2016), 92 pages.
Lufthanasa Systems Blog, "Lido eRouteManual 4.3 Design Overview", (2016) Retrieved from the Internet.
Maptiler, "Software performs Geocoding, Place name search, and Reverse Geocoding." Retrieved from Internet on Nov. 11, 2021.
Microsoft, "Generate a thumbnail sprite with Azure Media Services", (2021), Retrieved from Internet Nov. 11, 2021.
Narkive Mailinglist Archive, "Fastest Method of Drawing a TileMap", (2002), Retrieved from Internet Nov. 11, 2021.
Navigraph, "Navigraph Charts", Retrieved from the Internet.
Pamental, Jason, "Digging in to dynamic typography", Retrieved from Internet, Nov. 11, 2021, 11 pages.
Pamental, Jason, "The evolution of typography with variable fonts", Retrieved from the Internet, Nov. 11, 2021.
Penquerch, "[AD] RLE clipping speedup patch" (2002), Retrieved from Internet, Nov. 11, 2021.
QGIS: Open-source cross-platform GIS software, Retrieved from Internet, Nov. 11, 2021.
Somasundaram, K. "A Method for Filling Holes in Objects of Medical Images Using Region Labeling and Run Length Encoding Schemes." (2010).
Anonymous: "Pilot's Guide to Foreflight Mobile 82nd Edition Covers ForeFlight Mobile v12.7", Aug. 26, 2020, pp. 161-165.
Anonymous: Pilot's Guide to Foreflight Mobile 82nd Edition Covers ForeFlight Mobile v12.7, Aug. 26, 2020, pp. 78-90.
Extended European Search Report dated Apr. 5, 2023, European Application No. 22207025.2.
Extended European Search Report dated Apr. 5, 2023, European Application No. 22207047.6.
Extended European Search Report dated Apr. 5, 2023; European Application No. 22207057.5.
Extended European Search Report dated Mar. 24, 2023; European Application No. 22207029.4.
Anonymous: "algorithm-Contour of a run-length-coded digital shape", Stack Overflow, Dec. 31, 2015, pp. 1-5, URL:https://stackoverflow.com/questions/32354807/contour-of-a-run-length-coded-digital-shape.
Extended European Search Report dated Apr. 21, 2023; European Application No. 222070609.
Extended European Search Report dated Jun. 13, 2023; European Application No. 222069544.
Neupane Prasanga et al: "Extracting Unknown Repeated Pattern in Tiled Images: 19th International Conference on Hybrid Intelligent Systems (HIS 2019) held in Bhopal, India, Dec. 10-12, 2019" In: Intelligent Autonomous Systems 13, International Publishing, Cham, vol. 1179, pp. 92-102.
Yang Y. et al: "Vectorization of Linear Features in Scanned Topographic Maps Using Adaptive Image Segmentation and Sequential Line Tracking", The International Archives of the Photogrammetry, Remote Sensing and Spatial Information Sciences, vol. XXXIX-B4, Aug. 25, 2012, pp. 103-108.
Anonymous: "SkyDemon Mobile, GBS handheld navigation devices for aircrfaft", Dec. 4, 2021; Internet URL https://web.archive.org/web/20211204140934/https://www.skydemon.aero/inflight/.
C. Pschierer et al, "Human factors analysis for a 2D enroute moving map application", SPIE, PO Box 10, Bellingham, WA 98227-0010 USA, vol. 5802, May 25, 2005.
Extended European Search Report dated Apr. 11, 2023; European Application No. 22207123.5.
Extended European Search Report dated Apr. 12, 2023; European Application No. 22207050.0.
Extended European Search Report dated Apr. 12, 2023; European Application No. 22207124.3.
Extended European Search Report dated Apr. 18, 2023; European Application No. 22207164.9.
Rockwell Collins: "Flight Database Services for Pro Line Fusuion", Jan. 12, 2021, XP093035870, Internet URL: https://www.rockwellcollins.com/-/media/files/unsecure/products/product-brochures/navigation-and-guidance/flight-management-systems/resources/fusion-data-base-services-01.pdf?la=en&lastupdate=20210125195039&csrt=15271691716207860418, p. 5.
Skysectionals: "Tour Low-Altitute Enroute Charts", Sep. 22, 2021; XP093035866, Internet: URL:https://web.archive.org/web/20210922184910/https://skysectionals.com/tour-enroute/.
Stephen Dubet; Institute of Electrical and Electronics Engineers: "Aeronautical charts for electronic flight bags", 22nd. DASC. The 22nd Digital Avionics Systems Conference Proceedings. Indianapolis, IN Oct. 12-16, 2003. vol. 2, pp. 13_D_1_1_13_D_1_9, XP010669024.
Extended European Search Report dated Apr. 4, 2023; European Application No. 22207012.0.
Extended European Search Report dated Apr. 5, 2023; European Application No. 22207019.5.

\* cited by examiner

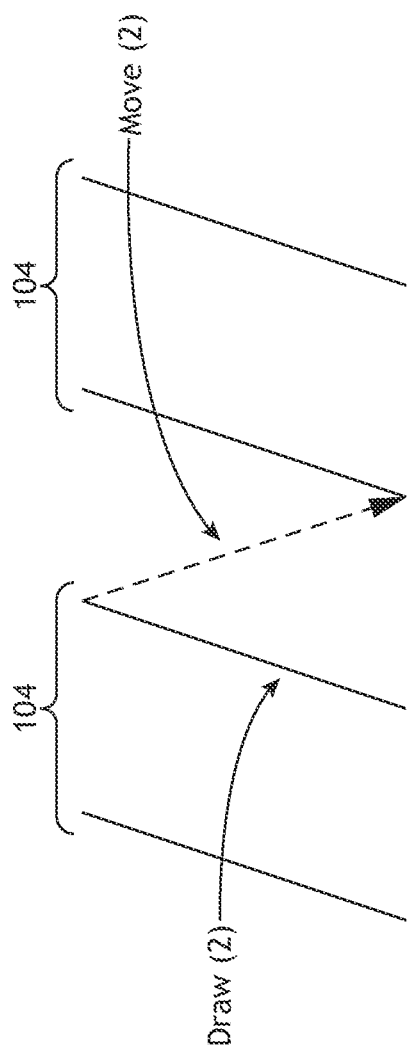

700

702 — OBTAINING, BY AT LEAST ONE PROCESSOR COMMUNICATIVELY COUPLED TO AT LEAST ONE COMPUTER READABLE MEDIUM, A GRAPHICAL IMAGE FILE, THE GRAPHICAL IMAGE FILE INCLUDING AN IMAGE, WHEREIN THE IMAGE INCLUDES AT LEAST ONE SEQUENCE OF REPEATING PATTERN ELEMENTS, EACH OF THE AT LEAST ONE SEQUENCE INCLUDING THE REPEATING PATTERN ELEMENTS THAT ARE REPEATED ALONG A LINEAR DIRECTION

704 — CONVERTING, BY THE AT LEAST ONE PROCESSOR, THE GRAPHICAL IMAGE FILE TO AT LEAST ONE FILE INCLUDING HARDWARE DIRECTIVES THAT WHEN EXECUTED CAUSE A RECREATION OF THE IMAGE OF THE GRAPHICAL IMAGE FILE TO BE DRAWN, WHEREIN A FILE SIZE OF THE AT LEAST ONE FILE IS SMALLER THAN THE GRAPHICAL IMAGE FILE

FIG.7

SYSTEM AND METHOD FOR RECREATING IMAGE WITH REPEATING PATTERNS OF GRAPHICAL IMAGE FILE TO REDUCE STORAGE SPACE

CROSS-REFERENCE TO RELATED APPLICATIONS

The present application is related to and claims priority from: U.S. application Ser. No. 63/278,576, filed Nov. 17, 2021. U.S. application Ser. No. 63/278,576 is herein incorporated by reference in its entirety.

BACKGROUND

The space required to store flight charts in an avionics system is large, and the available space to store flight charts in those avionics systems is limited. Additionally, avionics systems typically must maintain a multitude of potentially needed flight charts for each flight, which compounds the storage capacity problem.

SUMMARY

In one aspect, embodiments of the inventive concepts disclosed herein are directed to a system. The system may include at least one computer readable medium and at least one processor communicatively coupled to the at least one computer readable medium. The at least one processor may be configured to: obtain a graphical image file, the graphical image file including an image, wherein the image includes at least one sequence of repeating pattern elements, each of the at least one sequence including the repeating pattern elements that are repeated along a linear direction; and convert the graphical image file to at least one file including hardware directives that when executed cause a recreation of the image of the graphical image file to be drawn, wherein a file size of the at least one file is smaller than the graphical image file.

In a further aspect, embodiments of the inventive concepts disclosed herein are directed to a method. The method may include: obtaining, by at least one processor communicatively coupled to at least one computer readable medium, a graphical image file, the graphical image file including an image, wherein the image includes at least one sequence of repeating pattern elements, each of the at least one sequence including the repeating pattern elements that are repeated along a linear direction; and converting, by the at least one processor, the graphical image file to at least one file including hardware directives that when executed cause a recreation of the image of the graphical image file to be drawn, wherein a file size of the at least one file is smaller than the graphical image file.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 6 is a view of an exemplary embodiment of a sequence of repeating pattern elements according to the inventive concepts disclosed herein.

FIG. 7 is a diagram of an exemplary embodiment of a method according to the inventive concepts disclosed herein.

DETAILED DESCRIPTION

Figure 1:
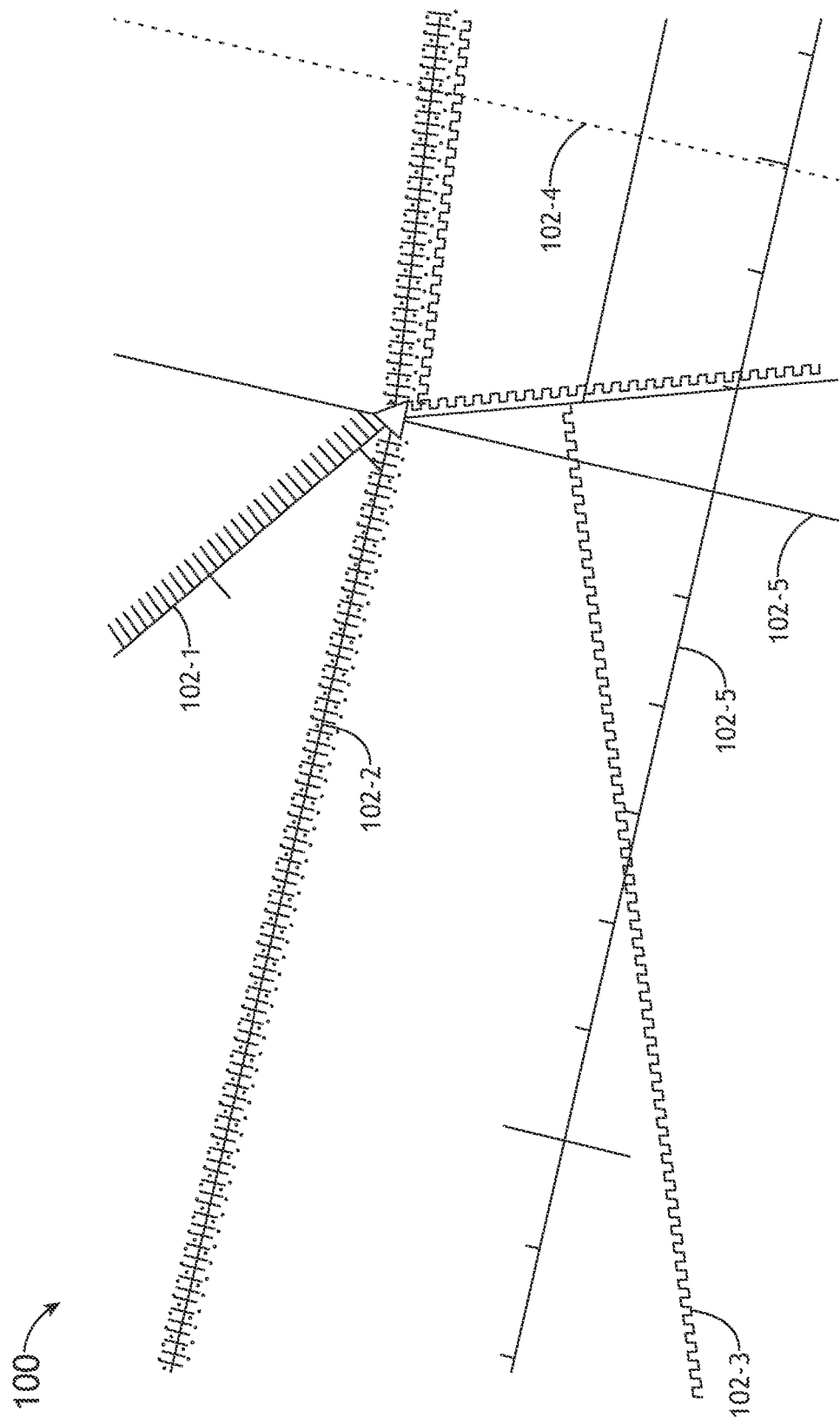
FIG. 1 is a view of an exemplary embodiment of an image of an image file according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system and a method configured to recreate an image of a graphical image file to reduce storage space, the image having repeating patterns.

Some embodiments may provide a system and method to condense certain types of repeating information in a display system (e.g., an avionics display system) without affecting the image displayed. While some embodiments may be used by an avionics display system, other embodiments may be used in any suitable system that handles images having repeating patterns that could be condensed to reduce storage space.

In some embodiments, a processor may detect certain patterns in an image that repeat. If these repeating patterns are detected, the processor may condense the repeating patterns such that repeating patterns are stored in a manner to significantly reduce the storage space required.

Referring now to FIG. 1, an exemplary embodiment of an image (e.g., a flight chart image 100) of an image file (e.g., a graphical image file) according to the inventive concepts disclosed herein is depicted. For example, flight charts typically have many repeating patterns that traverse the flight chart image 100 in various directions. For example, the flight chart image 100 includes multiple sequences of various repeating pattern elements. For example, the flight chart image 100 includes a special use airspace (SUA) boundary 102-1, an air route traffic control center (ARTCC) boundary 102-3, an air defence identification zone (ADIZ) boundary 102-2, longitudinal and latitudinal tick mark lines 102-5, and a time zone boundary 102-4, all of which are sequences of repeating pattern elements.

Figure 2:
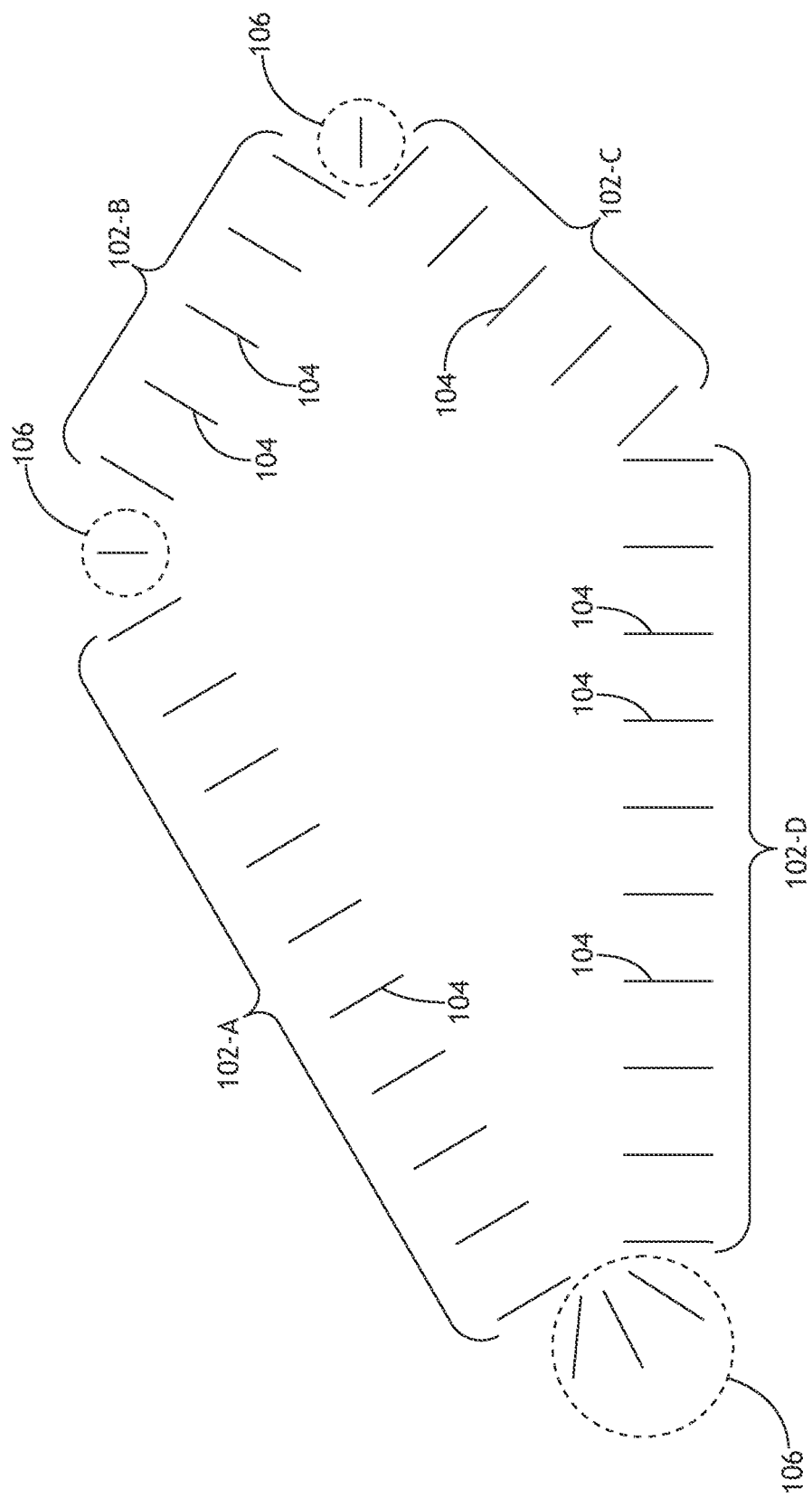
FIG. 2 is a view of an exemplary embodiment of sequences of repeating pattern elements and transients according to the inventive concepts disclosed herein.
Figure 3:
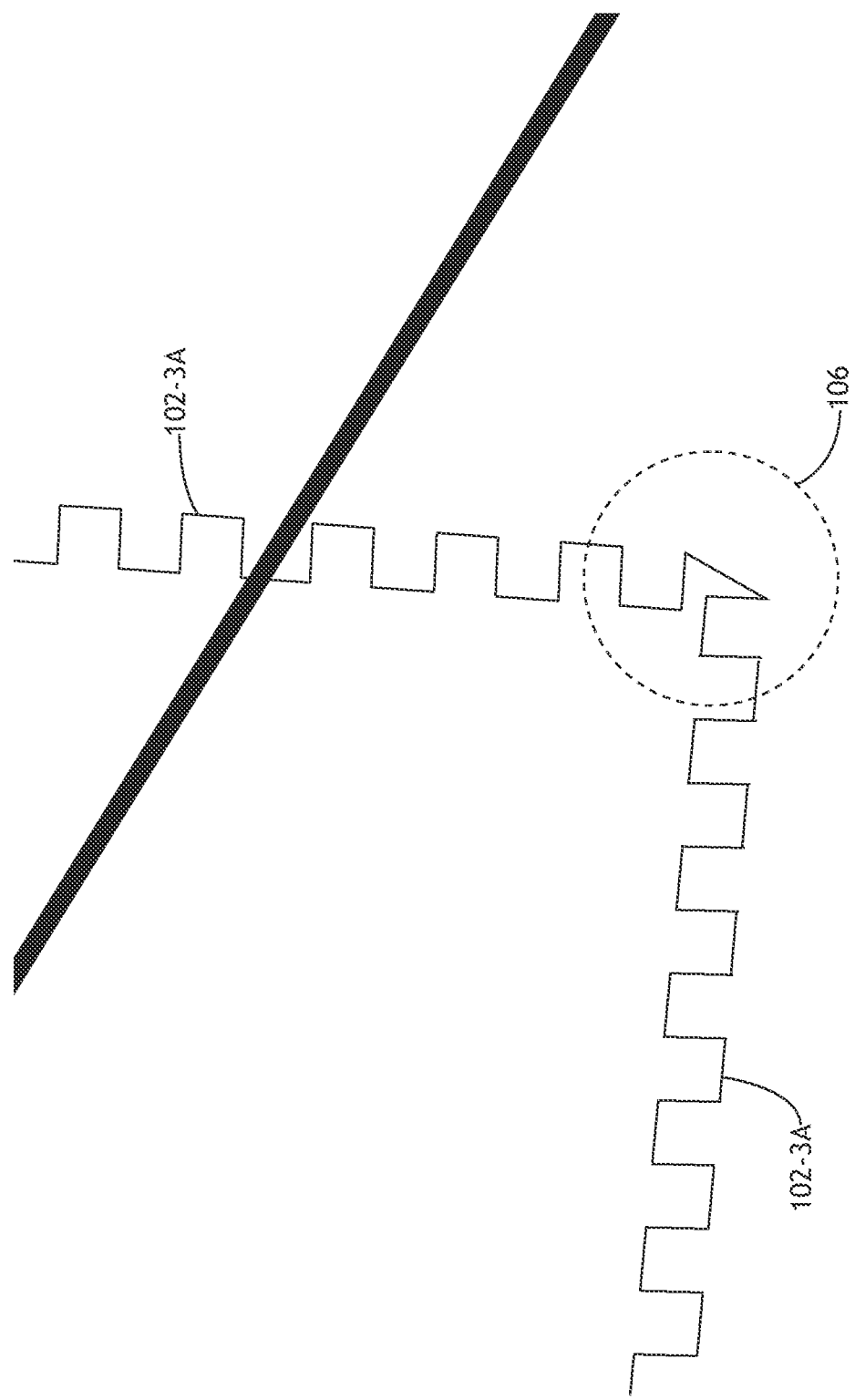
FIG. 3 is a view of an exemplary embodiment of sequences of repeating pattern elements and transients according to the inventive concepts disclosed herein.

Referring now to FIGS. 2 and 3, an exemplary embodiments of exemplary sequences 102A, 102B, 102C, 102D, 102-3A (which generically may be referred to as sequence 102 throughout) of repeating pattern elements 104 and transients 106 according to the inventive concepts disclosed herein is depicted.

As shown, in some instances, when two or more sequences 102 meet at an intersection, a transient 106 may be drawn in the image. The transients 106 may be between the sequences 102. The transients 106 may be partial sequences or individual lines not in the sequence 102. The transients 106 may be drawn independently, and typically would not be condensed like the sequences 102 of repeating pattern elements 104. For example, as shown in FIG. 3, a closed SUA boundary's 102-3 (composed of two intersecting sequences 102-3A of repeating pattern elements 104), for instance, may have transients 106, which may have short non-common lines at corners and/or single lines that have non-common move instructions. Transients 106 may be drawn as any line typically would be drawn, such as without using subroutines to condense sequences 102 of repeating pattern elements 104.

Figure 4:
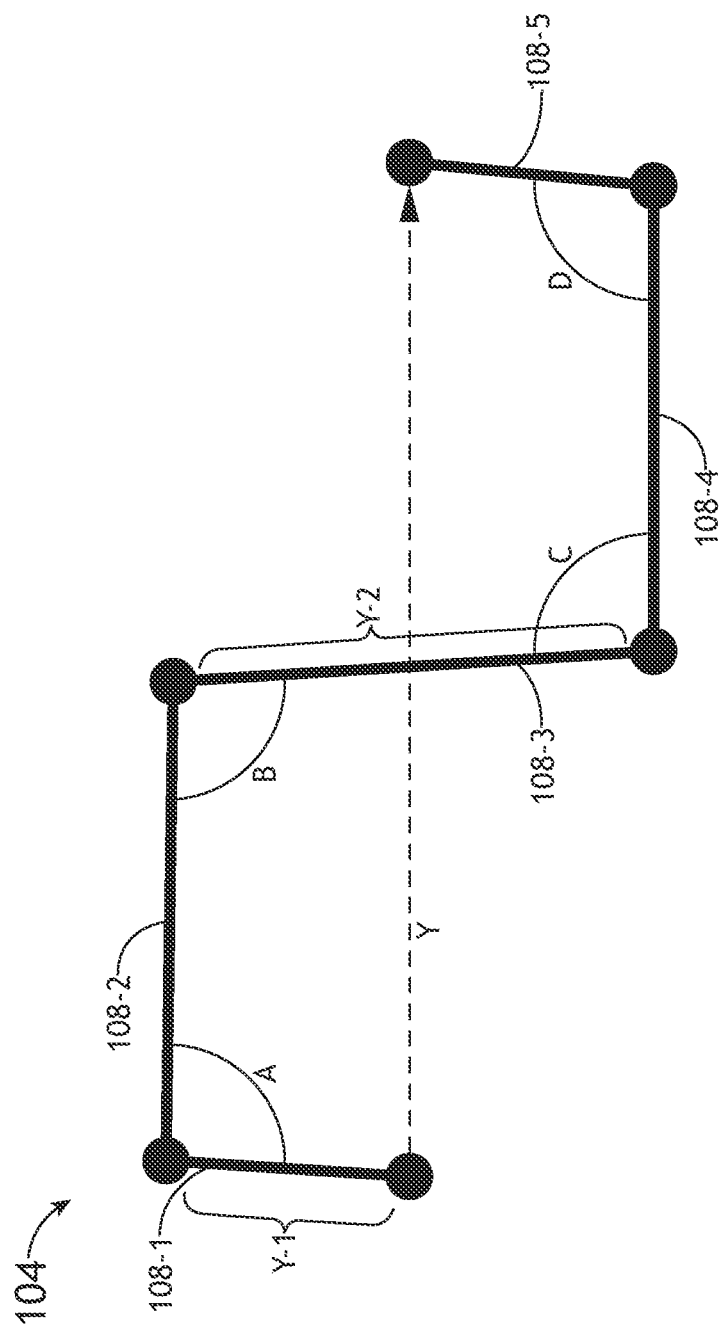
FIG. 4 is a view of an exemplary embodiment of an exemplary repeating pattern element according to the inventive concepts disclosed herein.

Referring now to FIG. 4, an exemplary embodiment of exemplary repeating pattern element 104 according to the inventive concepts disclosed herein is depicted. As exemplarily shown, the repeating pattern element 104 may include five repeating pattern sub-elements 108-1, 108-2, 108-3, 108-4, 108-5 (which collectively may be referred to as 108). A plurality of the repeating pattern elements 104 may be repeated along a linear direction to form the sequence 102. As exemplarily shown in FIG. 4, the repeating pattern element 104 may be a repeating component of an ARTCC boundary 102-3. The five sub-element 108 lines may make four vertices that have angles totaling zero degrees.

Figure 5:
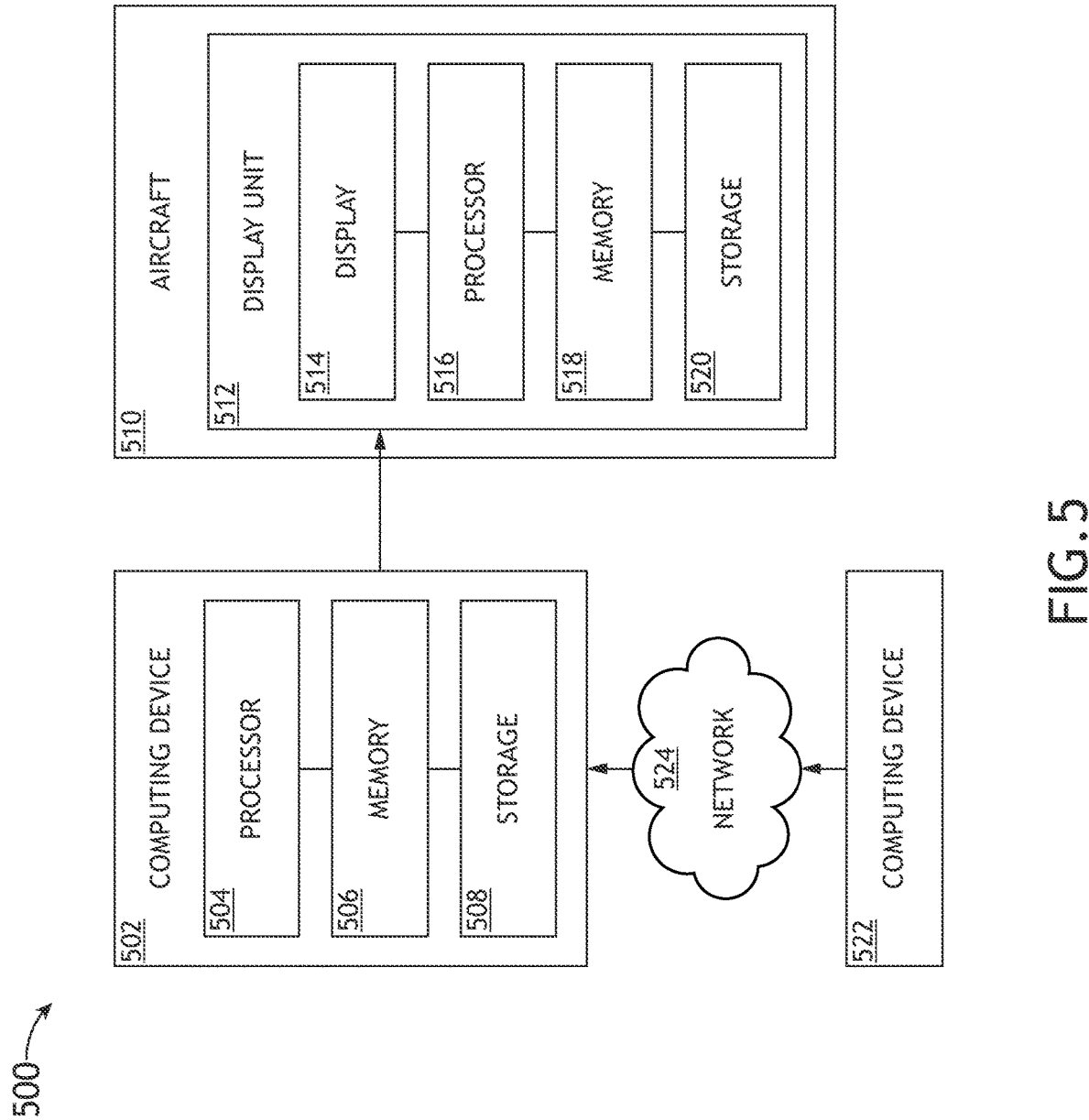
FIG. 5 is a view of an exemplary embodiment of a system according to the inventive concepts disclosed herein.

Referring now to FIG. 5, an exemplary embodiment of a system 500 according to the inventive concepts disclosed herein is depicted. In some embodiments, the system 500 may include at least one computing device 502, at least one aircraft 510, at least one computing device 522, and/or at least one network 524, some or all of which may be communicatively coupled at any given time.

For example, the computing device 502 may be configured to obtain (e.g., receive from the computing device 522) a graphical image file, the graphical image file including an image (e.g., a flight chart image 100). The image may include at least one sequence 102 of repeating pattern elements 104, and each of the at least one sequence 102 may include the repeating pattern elements that are repeated along a linear direction. For example, the computing device 502 may be configured to convert the graphical image file to at least one file including hardware directives that when executed cause a recreation of the image of the graphical image file to be drawn, wherein a file size of the at least one file is smaller than the graphical image file. In some embodiments, the at least one file may be output by the computing device 502 and loaded onto an avionics computing device of the aircraft 510, such as a display unit computing device 512. For example, the display unit computing device 512 may be configured to execute the hardware directives of the at least one file, which causes a recreation of the image of the graphical image file to be drawn on a display 514 of the display unit computing device 512.

The at least one computing device 502 may be implemented as any suitable computing device, such as a host computing device located offboard of the aircraft 510 and/or located remotely from the aircraft 510. The at least one computing device 502 may include any or all of the elements, as shown in FIG. 5. For example, the computing device 502 may include at least one processor 504, at least one memory 506, and/or at least one storage 508, some or all of which may be communicatively coupled at any given time. For example, the at least one processor 504 may include at least one central processing unit (CPU), at least one graphics processing unit (GPU), at least one field-programmable gate array (FPGA), at least one application specific integrated circuit (ASIC), at least one digital signal processor, at least one image processor, at least one virtual machine (VM) running on at least one processor, and/or the like configured to perform (e.g., collectively perform) any of the operations disclosed throughout. For example, the at least one processor 504 may include a CPU and a GPU configured to perform (e.g., collectively perform) any of the operations disclosed throughout. The processor 504 may be configured to run various software applications or computer code stored (e.g., maintained) in a non-transitory computer-readable medium (e.g., memory 506 and/or storage 508) and configured to execute various instructions or operations. The processor 504 of the computing device 502 may be configured to perform any or all of the operations disclosed throughout. For example, the processor 504 of the computing device 502 may be configured to: obtain a graphical image file (e.g., a graphical flight chart image file), the graphical image file including an image (e.g., a flight chart image 100), wherein the image includes at least one sequence 102 of repeating pattern elements 104, each of the at least one sequence 102 including the repeating pattern elements 104 that are repeated along a linear direction; and/or convert the graphical image file to at least one file including hardware directives that when executed cause a recreation of the image of the graphical image file to be drawn, wherein a file size of the at least one file is smaller than the graphical image file.

In some embodiments, the graphical image file has a set of vector graphics for each repeating pattern element 104, wherein a given set of vector graphics for each repeating pattern element 104 of the graphical image file is converted to a more compact set of vector graphics in the recreation of the image (e.g., the flight chart image 100), wherein a given more compact set of vector graphics fully defines a given repeating pattern element 104 from the graphical image file.

In some embodiments, each repeating pattern element 104 of the repeating pattern elements 104 is composed of repeating pattern sub-elements 108.

In some embodiments, the file size of the at least one file is at least 75% (e.g., at least 90%) smaller than the graphical image file.

In some embodiments, the graphical image file may be any suitable type of graphical image file that has at least one sequence 102 of repeated pattern elements 104. For example, the graphical image file may be a portable digital file (PDF), a Joint Photographic Experts Group (JPEG) file, a Portable Network Graphics (PNG) file, a graphics interchange format (GIF) file, a tagged image file (TIFF), a Photoshop document (PSD), an encapsulated postscript (EPS) file, an Adobe Illustrator (AI) document, an Adobe Indesign Document (INDD), or a raw image format.

In some embodiments, the at least one processor 504 being configured to convert the graphical image file to the at least one file comprises the at least one processor 504 being configured to: for a given sequence 102 of the at least one sequence 102 of repeating pattern elements 104, determine a length of the given sequence 102 of repeating pattern elements 104; for the given sequence 102, determine a straight-line length along the linear direction of one repeating pattern element 104 of the repeating pattern elements 104; for the given sequence, based at least on the length and the straight-line length, determine a quantity of the repeating pattern elements 104 for the given sequence 102; store repeating pattern element hardware directives that when executed cause the repeating pattern element 104 to be drawn once; and/or store binary progression hardware directives that when executed cause a binary progression of the repeating pattern element hardware directives to be called such that the given sequence 102 of repeating pattern elements 104 is drawn. In some embodiments, at least one of the hardware directives includes scaling and rotational characteristics necessary for drawing the given sequence of repeating pattern elements to match a scale and angular orientation of the given sequence of repeating pattern elements in the image (e.g., the flight chart image 100) of the graphical image file. In some embodiments, the at least one sequence 102 comprises the given sequence 102 and a second sequence 102, wherein the given sequence 102 of repeating pattern elements 104 meets the second sequence 102 of repeating pattern elements 104 at an angle; in such embodiments, the at least one processor being configured to convert the graphical image file to the at least one file may further comprise the at least one processor being configured to: store transient hardware directives that when executed cause a transient to be drawn where the given sequence and the second sequence meet.

In some embodiments, the image of the graphical image file is a flight chart image 100, and when the hardware directives are executed by a display unit computing device 512 of an aircraft 510, the recreation of the flight chart image 100 of the graphical image file is drawn on a display 514 of the display unit computing device 512. In some embodiments, the at least one sequence 102 of repeating pattern elements 104 corresponds to at least one of a special use airspace (SUA) boundary 102-1, an air route traffic control center (ARTCC) boundary 102-3, an air defence identification zone (ADIZ) boundary 102-2, a longitudinal tick mark line 102-5, a latitudinal tick mark line 102-5, or a time zone boundary 102-4.

In some embodiments, the aircraft 510 may include at least one user (e.g., flight crew and/or pilot(s)) (not shown), at least one display unit computing device 512, at least one aircraft computing device (not shown), and/or at least one user interface (not shown), some or all of which may be communicatively coupled at any given time.

The display unit computing device 512 may be implemented as any suitable computing device, such as a primary flight display (PFD) computing device and/or a multi-function window (MFW) display computing device. As shown in FIG. 5, the display unit computing device 512 may include at least one display 514, at least one processor 516, at least one memory 518, and/or at least one storage 520, some or all of which may be communicatively coupled at any given time. For example, the at least one processor 516 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 516 may include a CPU and a GPU configured to perform (e.g., collectively perform) any of the operations disclosed throughout. The processor 516 may be configured to run various software applications (e.g., a PFD application, and/or an MFW application) and/or computer code stored (e.g., maintained) in a non-transitory computer-readable medium (e.g., memory 518 and/or storage 520) and configured to execute various instructions or operations. The processor 516 may be configured to perform any or all of the operations disclosed throughout. For example, the processor 516 may be configured to: obtain the at least one file (e.g., from the computing device 502); and/or execute the hardware directives of the at least one file, which causes a recreation of the image of the graphical image file to be drawn on a display 514 of the display unit computing device 512. The display 514 may be configured to display the recreation of the image (e.g., a flight chart image 100) of the graphical image file.

In some embodiments, the at least one display unit computing device 104 for the aircraft 510 may be located offboard of the aircraft 102, for example, if a given aircraft 102 is a remotely piloted and/or managed aircraft (e.g., an unmanned aerial vehicle (UAV) or a drone aircraft).

In some embodiments, the computing device 522 may be any suitable computing device. The computing device 522 may have similar elements and functionality as the computing device 502, except that the computing device 522 may be configured to provide (e.g., via the network 524) the graphical image file to the computing device 502. In some embodiments, the computing device 522 may be operated by a third-party vendor of the graphical image file.

For example, the processor 504 of the computing device 502 may be configured to: (a) detect a sequence 102 of repeating pattern elements 104. The processor 504 may be configured to: (b) create a subroutine of drawing a single repeating pattern element 104 of the image (e.g., the flight chart image 100) of the graphical image file in hardware directives, followed by a return. The actual drawn image of the single repeating pattern element 104 may be referred to as C0. The processor 504 may be configured to: (c) create a function to call the single repeating pattern element 104 (which may be referred to as C1), followed by a return. The processor 504 may be configured to: (d) create a function to call C1 twice (which may be referred to as C2), followed by a return. The processor 504 may be configured to: (e) create a function to call C2 twice (which may be referred to as C4), followed by a return. The processor 504 may be configured to: (f) create a function to call Cn twice (which may be referred to as C2n) as needed, storing each call location. The processor 504 may be configured to: (g) when the sequence 102 of repeating pattern elements 104 is found, determine a number of repeating pattern elements 104 in the sequence 102; determine a highest value of $2^n$ that goes into that number without exceeding the number; and create more Cn calls if the value of $2^n$ is greater than the available largest Cn call. The processor 504 may be configured to: (h) using a method for low maintenance machine code subroutine execution, add each Cn routine to a display list organization area of a hardware display list, tracking the location of each called function. To invoke hardware subroutines, the absolute address of the subroutine should be known. This address is not known on the host when the hardware directives are created, so this address should be updated by the display system at run-time. The processor 504 may be configured to: (i) set the scaling and rotational characteristics as necessary. Typically, a repeating pattern element 104 may be defined in horizontal orientation, but will be drawn in a non-horizontal orientation. The processor 504 may be configured to: (j) call the Cn functions as indirect calls within the hardware display list. This may be done as necessary to draw the required number of repeating pattern elements 104 in the sequence 102. This is a binary progression. For example, if there are 201 repeating pattern elements 104 in the sequence 102, the following calls would be made: C128, C64, C8, C1. The processor 504 may be configured to: (k) handle transients.

For example, referring again to FIG. 4, the repeating pattern element 104 may include five repeating pattern sub-elements 108-1, 108-2, 108-3, 108-4, 108-5 (which collectively may be referred to as 108). A plurality of the repeating pattern elements 104 may be repeated along a linear direction to form the sequence 102. As exemplarily shown in FIG. 4, the repeating pattern element 104 may be a repeating component of an ARTCC boundary 102-3. The five sub-element 108 lines may make four vertices that have angles totaling zero degrees. The space required to display one-hundred (100) of the repeating pattern elements 104 in the sequence 102 would be 100 * 5 * 2 (sequence 102 length multiplied by lines in an repeating pattern element 104 multiplied by times number of instructions to draw a line), or 1000. However, using the method of some embodiments described herein, the space required to draw the same sequence 102 of 100 repeating pattern elements 104 would be 35 (a space savings of 96.5%). The space of 35 would include: 11 to define the repeating pattern element 104; 2 to define the subroutine C1 (call and return); 18 to define subroutines C2, C4, C8, C16, C32, C64 (3 each: 2 calls and return); and 4 calls in the hardware display list (calls to C64, C32, C4, and C2). Additionally, for example, a second sequence 102 of 100 of the repeating pattern elements 104 would cost just 4 instructions since the C1-C64 functions would already exist (a space savings of 99.6%). Referring now to FIG. 6, in a similar way as the preceding example, a sequence 102 of 100 repeating pattern elements 104, which has only 4 double words (DWords) draw sequence (draw (2)+move (2) sequence), would have similar percentage space savings. For example, the repeating pattern element 104 would be a line drawn at an angle and a move instruction placing the stylus at the next position to draw from. The repeating pattern element 104 may be any combination of line draws and moves that allow the repeating pattern to be created. In some embodiments, the draw command takes 2 hardware directives and a move command takes 2 hardware directives. For example, a SUA, created as a repeating pattern, may take one draw and one move, or 4 total hardware directives.

In some embodiments, the at least one display unit computing device 512, the computing device 502, and/or the computing device 522 may be implemented as a single computing device or any number of computing devices configured to perform (e.g., collectively perform if more than one computing device) any or all of the operations disclosed throughout.

At least one processor (e.g., the at least one processor 504 and/or the at least one processor 516) may be configured to perform (e.g., collectively perform) any or all of the operations disclosed throughout.

Referring now to FIG. 7, an exemplary embodiment of a method 700 according to the inventive concepts disclosed herein may include one or more of the following steps. Additionally, for example, some embodiments may include performing one or more instances of the method 700 iteratively, concurrently, and/or sequentially. Additionally, for example, at least some of the steps of the method 700 may be performed in parallel and/or concurrently. Additionally, in some embodiments, at least some of the steps of the method 700 may be performed non-sequentially.

A step 702 may include obtaining, by at least one processor communicatively coupled to at least one computer readable medium, a graphical image file, the graphical image file including an image, wherein the image includes at least one sequence of repeating pattern elements, each of the at least one sequence including the repeating pattern elements that are repeated along a linear direction.

A step 704 may include converting, by the at least one processor, the graphical image file to at least one file including hardware directives that when executed cause a recreation of the image of the graphical image file to be drawn, wherein a file size of the at least one file is smaller than the graphical image file.

Further, the method 700 may include any of the operations disclosed throughout.

As will be appreciated from the above, embodiments of the inventive concepts disclosed herein may be directed to a system and a method configured to recreate an image of a graphical image file to reduce storage space, the image having repeating patterns.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   at least one computer readable medium; and
   at least one processor communicatively coupled to the at least one computer readable medium, the at least one processor configured to:
   obtain a graphical image file, the graphical image file including an image, wherein the image includes at least one sequence of repeating pattern elements, each of the at least one sequence including the repeating pattern elements that are repeated along a linear direction; and
   convert the graphical image file to at least one file including hardware directives that when executed cause a recreation of the image of the graphical image file to be drawn,
   wherein a file size of the at least one file is smaller than the graphical image file,
   wherein the graphical image file has a set of vector graphics for each repeating pattern element, wherein a given set of vector graphics for each repeating pattern element of the graphical image file is converted to a more compact set of vector graphics in the recreation of the image, wherein a given more compact set of vector graphics fully defines a given repeating pattern element from the graphical image file,
   wherein the image of the graphical image file is a flight chart image, wherein when the hardware directives are executed by a display unit computing device of an aircraft, the recreation of the flight chart image of the graphical image is drawn on a display of the display unit computing device.

2. The system of claim 1, wherein the file size of the at least one file is at least 75% smaller than the graphical image file.

3. The system of claim 1, wherein the graphical image file is a portable digital file (PDF).

4. The system of claim 1, wherein the at least one processor being configured to convert the graphical image file to the at least one file comprises the at least one processor being configured to:
   for a given sequence of the at least one sequence of repeating pattern elements, determine a length of the given sequence of repeating pattern elements;
   for the given sequence, determine a straight-line length along the linear direction of one repeating pattern element of the repeating pattern elements;
   for the given sequence, based at least on the length and the straight-line length, determine a quantity of the repeating pattern elements for the given sequence;
   store repeating pattern element hardware directives that when executed cause the repeating pattern element to be drawn once; and
   store binary progression hardware directives that when executed cause a binary progression of the repeating pattern element hardware directives to be called such that the given sequence of repeating pattern elements is drawn.

5. The system of claim 4, wherein at least one of the hardware directives includes scaling and rotational characteristics necessary for drawing the given sequence of repeating pattern elements to match a scale and angular orientation of the given sequence of repeating pattern elements in the image of the graphical image file.

6. The system of claim 4, wherein the at least one sequence comprises the given sequence and a second sequence, wherein the given sequence of repeating pattern elements meets the second sequence of repeating pattern elements at an angle, wherein the at least one processor being configured to convert the graphical image file to the at least one file further comprises the at least one processor being configured to:

store transient hardware directives that when executed cause a transient to be drawn where the given sequence and the second sequence meet.

7. The system of claim 4, wherein the image of the graphical image file is a flight chart image, wherein when the hardware directives are executed by a display unit computing device of an aircraft, the recreation of the flight chart image of the graphical image file is drawn on a display of the display unit computing device.

8. The system of claim 7, wherein at least one of the hardware directives includes scaling and rotational characteristics necessary for drawing the given sequence of repeating pattern elements to match a scale and angular orientation of the given sequence of repeating pattern elements in the image of the graphical image file, wherein the at least one sequence comprises the given sequence and a second sequence, wherein the given sequence of repeating pattern elements meets the second given sequence of repeating pattern elements at an angle, wherein the at least one processor being configured to convert the graphical image file to the at least one file further comprises the at least one processor being configured to:
store transient hardware directives that when executed cause a transient to be drawn where the given sequence and the second sequence meet.

9. The system of claim 8, wherein the at least one sequence of repeating pattern elements corresponds to at least one of a special use airspace (SUA) boundary, an air route traffic control center (ARTCC) boundary, an air defence identification zone (ADIZ) boundary, a longitudinal tick mark line, a latitudinal tick mark line, or a time zone boundary.

10. The system of claim 1, further comprising a computing device comprising the at least one computer readable medium and the at least one processor, wherein the computing device is located remotely from the aircraft.

11. The system of claim 10, wherein the at least one sequence of repeating pattern elements corresponds to at least one of a special use airspace (SUA) boundary, an air route traffic control center (ARTCC) boundary, an air defence identification zone (ADIZ) boundary, a longitudinal tick mark line, a latitudinal tick mark line, or a time zone boundary.

12. The system of claim 1, wherein each repeating pattern element of the repeating pattern elements is composed of repeating pattern sub-elements.

13. A method, comprising:
obtaining, by at least one processor communicatively coupled to at least one computer readable medium, a graphical image file, the graphical image file including an image, wherein the image includes at least one sequence of repeating pattern elements, each of the at least one sequence including the repeating pattern elements that are repeated along a linear direction; and
converting, by the at least one processor, the graphical image file to at least one file including hardware directives that when executed cause a recreation of the image of the graphical image file to be drawn,
wherein a file size of the at least one file is smaller than the graphical image file,
wherein the graphical image file has a set of vector graphics for each repeating pattern element, wherein a given set of vector graphics for each repeating pattern element of the graphical image file is converted to a more compact set of vector graphics in the recreation of the image, wherein a given more compact set of vector graphics fully defines a given repeating pattern element from the graphical image file,
wherein the image of the graphical image file is a flight chart image, wherein when the hardware directives are executed by a display unit computing device of an aircraft, the recreation of the flight chart image of the graphical image is drawn on a display of the display unit computing device.

14. A system, comprising:
at least one computer readable medium; and
at least one processor communicatively coupled to the at least one computer readable medium, the at least one processor configured to:
obtain a graphical image file, the graphical image file including an image, wherein the image includes at least one sequence of repeating pattern elements, each of the at least one sequence including the repeating pattern elements that are repeated along a linear direction; and
convert the graphical image file to at least one file including hardware directives that when executed cause a recreation of the image of the graphical image file to be drawn,
wherein a file size of the at least one file is smaller than the graphical image file,
wherein the graphical image file has a set of vector graphics for each repeating pattern element, wherein a given set of vector graphics for each repeating pattern element of the graphical image file is converted to a more compact set of vector graphics in the recreation of the image, wherein a given more compact set of vector graphics fully defines a given repeating pattern element from the graphical image file,
wherein the at least one processor being configured to convert the graphical image file to the at least one file comprises the at least one processor being configured to:
for a given sequence of the at least one sequence of repeating pattern elements, determine a length of the given sequence of repeating pattern elements;
for the given sequence, determine a straight-line length along the linear direction of one repeating pattern element of the repeating pattern elements;
for the given sequence, based at least on the length and the straight-line length, determine a quantity of the repeating pattern elements for the given sequence;
store repeating pattern element hardware directives that when executed cause the repeating pattern element to be drawn once; and
store binary progression hardware directives that when executed cause a binary progression of the repeating pattern element hardware directives to be called such that the given sequence of repeating pattern elements is drawn.

15. The system of claim 14, wherein at least one of the hardware directives includes scaling and rotational characteristics necessary for drawing the given sequence of repeating pattern elements to match a scale and angular orientation of the given sequence of repeating pattern elements in the image of the graphical image file.

16. The system of claim 14, wherein the at least one sequence comprises the given sequence and a second sequence, wherein the given sequence of repeating pattern elements meets the second sequence of repeating pattern elements at an angle, wherein the at least one processor being configured to convert the graphical image file to the at least one file further comprises the at least one processor being configured to:

store transient hardware directives that when executed cause a transient to be drawn where the given sequence and the second sequence meet.

17. The system of claim 14, wherein the image of the graphical image file is a flight chart image, wherein when the hardware directives are executed by a display unit computing device of an aircraft, the recreation of the flight chart image of the graphical image file is drawn on a display of the display unit computing device.

18. The system of claim 17, wherein at least one of the hardware directives includes scaling and rotational characteristics necessary for drawing the given sequence of repeating pattern elements to match a scale and angular orientation of the given sequence of repeating pattern elements in the image of the graphical image file, wherein the at least one sequence comprises the given sequence and a second sequence, wherein the given sequence of repeating pattern elements meets the second given sequence of repeating pattern elements at an angle, wherein the at least one processor being configured to convert the graphical image file to the at least one file further comprises the at least one processor being configured to:

store transient hardware directives that when executed cause a transient to be drawn where the given sequence and the second sequence meet.

19. The system of claim 18, wherein the at least one sequence of repeating pattern elements corresponds to at least one of a special use airspace (SUA) boundary, an air route traffic control center (ARTCC) boundary, an air defence identification zone (ADIZ) boundary, a longitudinal tick mark line, a latitudinal tick mark line, or a time zone boundary.

20. The system of claim 14, wherein each repeating pattern element of the repeating pattern elements is composed of repeating pattern sub-elements.

* * * * *